April 28, 1970   C. A. CANCRO   3,509,558
WIDE RANGE DATA COMPRESSION SYSTEM
Filed Oct. 22, 1965   3 Sheets-Sheet 1

INVENTOR
Ciro A. Cancro

BY
ATTORNEYS

April 28, 1970     C. A. CANCRO     3,509,558
WIDE RANGE DATA COMPRESSION SYSTEM
Filed Oct. 22, 1965     3 Sheets-Sheet 2

INVENTOR
Ciro A. Cancro

BY

ATTORNEYS

United States Patent Office 3,509,558
Patented Apr. 28, 1970

3,509,558
WIDE RANGE DATA COMPRESSION SYSTEM
Ciro A. Cancro, Silver Spring, Md., assignor to the United States of America as represented by the Administrator of the National Aeronautics and Space Administration
Filed Oct. 22, 1965, Ser. No. 502,743
Int. Cl. H03b 3/02
U.S. Cl. 340—347                         7 Claims

ABSTRACT OF THE DISCLOSURE

There is disclosed an analog data compression system. The data signal to be compressed is applied to both arms of a parallel system, in one portion of the system the signal being delayed while in the other portion, the magnitude of the signal is measured. The output from a range detector, which measures signal magnitude, is fed to an attenuator control network which in turn controls the level of attenuation applied on the delayed input signal. The output of the system is fed typically to an analog-to-digital converter and also, the output of the range detector is also read out. The combined digital signal yields complete transmission of the information contained in the input analog signal.

---

The invention described herein may be manufactured and used by and for the Government of the United States of America for governmental purposes without the payment of any royalties thereon or therefor.

This invention relates generally to data compression systems and more particularly to a wide range analog data compression system for compressing an analog signal prior to its being applied to an analog-to-digital converter.

Data compression systems have, in recent years, become valuable to space exploration for compressing the data contained in wide range signals into smaller ranges more suitable for easy digital transmission to receiving telemetry stations located on the earth's surface. Various approaches to data compression have evolved for use in this environment. A distinct advantage of compressing a signal prior to transmission resides in the ability to transmit the smallest signal that contains sufficient information resulting in the utilization of the smallest feasible amount of transmission power. However, data compression systems are not necessarily limited to a spacecraft but are useful when information is being applied to a measuring instrument which has limited capability or where information is applied to a transmission and receiving system which has a limited capability. By compressing all necessary data into its minimum range, this information can be transmitted over systems having reduced capacity either in terms of information input or output or in terms of power input or output.

Previously developed methods of data compression where information, contained in an electromagnetic signal, was in analog form but was to be transmitted in digital form involved first converting the signal to digital form. However methods of digital compression have certain disadvantages, particularly when used in a satellite system, in that they generally require the use of relatively high voltages. Further the conversion time of the analog-to-digital converter is greatly increased, primarily due to having to convert information which is later compressed into smaller form. It is also apparent that power is wasted in having to convert a large signal rather than a smaller compressed signal. In addition, the utilization of a digital word compression circuit subsequent to the analog-to-digital conversion unit introduces additional complex circuitry to the overall system.

The utilization of a simple attenuator circuit, such as a voltage divider with a plurality of settings, prior to the analog-to-digital conversion, also has disadvantages. The principal disadvantage is that the switching of the attenuator circuit to different settings may create transients which have a magnitude in excess of the signal to be compressed, thus resulting in a loss of data until after the transient has decayed to a minimal value. It is obvious that this can create serious problems particularly when the signal to be compressed operates over a wide dynamic range and the switching occurs at frequent intervals.

The purpose of this invention is to provide a data compression system which embraces all of the advantages of similarly employed devices and possess none of the aforementioned disadvantages. Generally, the invention relates to an improved attenuator system for data compression, the output of which is within a predetermined range of magnitude for application to an output device such as an analog-to-digital converter. To obtain this the invention contemplates a unique arrangement wherein the data to be compressed is amplitude detected by an input range detector which controls an attenuator controller, in series with it. In parallel with the detector and controller, is a time delay circuit in series with an attenuator circuit. The signal to be compressed is applied to both arms of the parallel system, one portion of the signal being delayed while the other portion is being magnitude measured. The magnitude of the input signal determines the amount of attenuation, if any, to be applied to the delayed input signal to place the output of this compression system within the input range of the analog-to-digital converter to which it is to be applied. The output from the analog-to-digital converter will now be in compressed form for easy transmission to a foreign receiving station using minimum power. Also transmitted along with the A-to-D converter output is the signal which indicates the amount of compression that has taken place, so that the final received output signal will be expanded by the appropriate factor.

Therefore, an object of the present invention is the provision of an improved data compression system.

A further object of the invention is the provision of an improved data compression system which utilizes an attenuator circuit whose switching transients are considerably smaller than the magnitude of the signal to be attenuated.

Still another object is to provide a wide dynamic range analog data compression system wherein transients introduced into the system are small compared to the magnitude of the analog signal to be compressed.

Other objects and many of the attendant advantages of this invention will be readily appreciated as the same becomes better understood by reference to the following detailed description when considered in connection with the accompanying drawings in which like reference numerals designate like parts throughout the figures.

Figure 1:
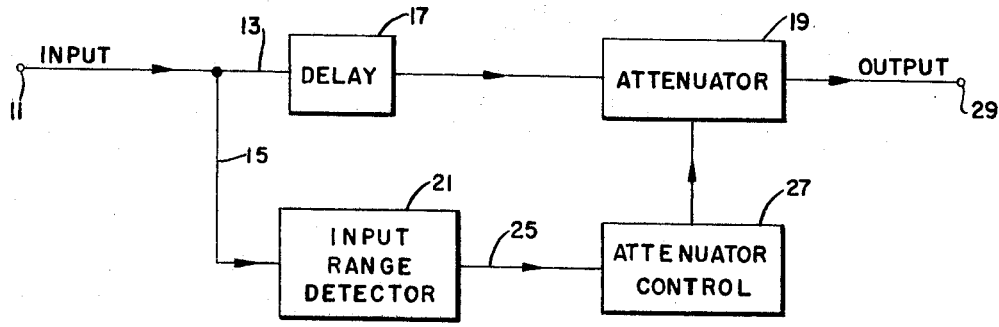
FIGURE 1 is a block diagram of one embodiment of the present invention.
Figure 5:
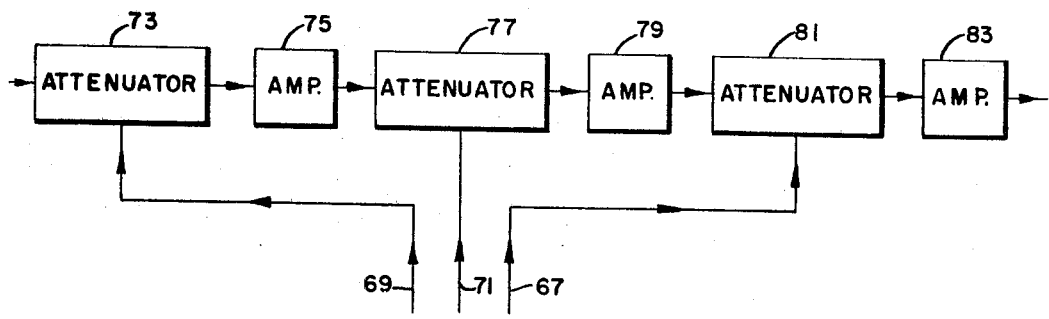
FIGURE 5 is a block diagram of one embodiment of the attenuator network shown in FIGURE 1.

Referring now to the drawings, wherein like reference characters designate like or corresponding parts throughout the several views, there is shown in FIGURE 1, which illustrates a preferred embodiment of the invention, an input terminal 11 to which electromagnetic analog signals are applied. Two parallel paths 13, 15 are provided for the incoming signal. In the first path 13 the signal is delayed (for reasons hereinafter explained) for a specified time, for example 3 microseconds, by a time delay network 17 and thereafter attenuated by an attenuator network 19. A preferred block diagram of network 19, containing three separate stages, is shown in FIGURE 5 and described below.

The analog signal at the input terminal 11 is also applied to a second path 15 that includes an input range detector 21 further described in FIGURE 2, which senses the magnitude of the analog signal, as hereinafter described, and provides a digital output signal 25 which represents said magnitude. This digital output signal 25 is applied to an attenuator control network 27, further described in FIGURE 4, to control the attenuator network 19, through which the signal from the time delay circuit 17 passes. The attenuator 19 further described in FIGURE 5, attenuates the delayed analog input signal applied to the input terminal 11 resulting in a signal at the output terminal 29 of the overall system which is within a specific known range as hereinafter described. This output 29 may then be applied to an analog-to-digital converter system which has an input capacity within this predetermined range.

Figure 2:
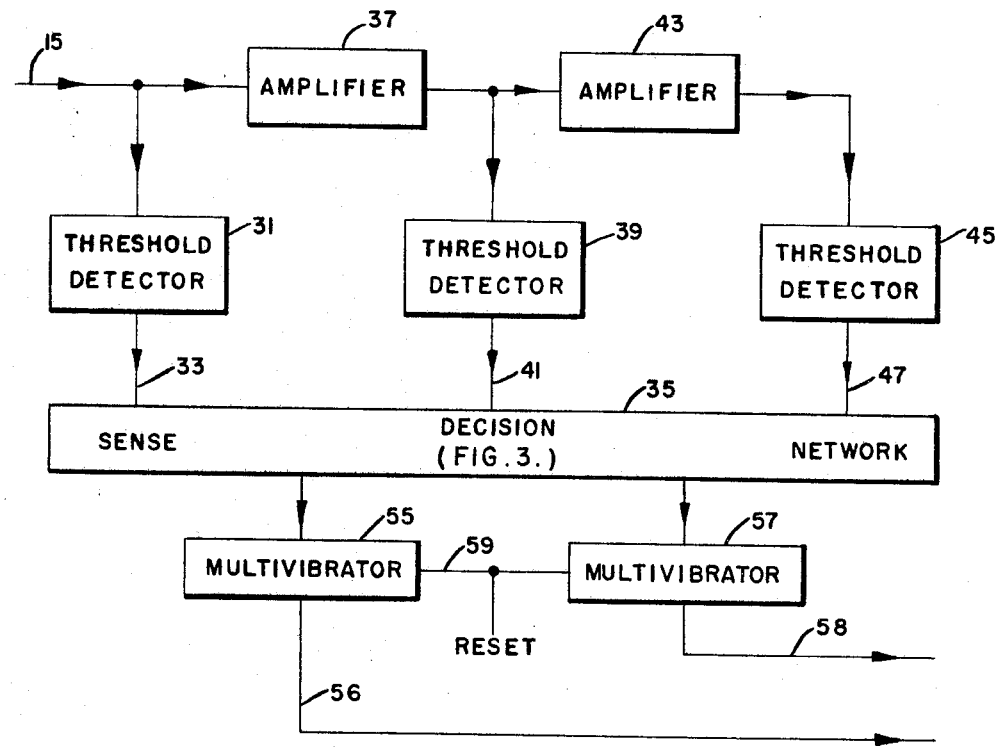
FIGURE 2 is a block diagram of one embodiment of the range detector network of FIGURE 1.

Turning now to FIGURE 2, there is shown in block diagram form one arrangement of the range detector 21. The portion of the analog signal applied to the input range detector is applied to a first threshold detector circuit 31 which makes an initial determination of the magnitude range of the analog signal. Specifically, if the signal applied to the first threshold detector 31 is of sufficient magnitude, an output signal 33 is generated which is applied to a sense decision network 35, hereinafter described. It is to be understood that the threshold level of detector 31 is selected in accordance with the known range of signal levels to be applied to the input 11 and the number of stages of the range detector.

No specific showing has been made for the above noted threshold detectors. Detectors of this type are well known in the art and may be a Schmitt trigger circuit whose trigger level is variable and set so that the circuit will change from its initial state whenever a signal of greater value than the predetermined minimum level is applied to its input. A reset circuit may then be provided to reset the detectors prior to the reception of another signal.

The input signal 15 to the range detector 21 is also applied to a first amplifier 37 which amplifies the input signal 15 by a predetermined amount. The output from the first amplifier 37 is applied both to a second threshold detector 39 as well as a second amplifier 43. The second threshold detector 39 generates an output signal 41 whenever a signal of sufficient magnitude is applied to it. This output signal 41 is also applied to the sense decision network 35 which operates in a manner hereinafter described.

The second amplifier 43 amplifies the input signal applied thereto by a predetermined amount and applies its output to a third threshold detector 45. The output from the third threshold detector 45 generates an output signal 47 whenever a signal of sufficient magnitude is applied to it. This output is also applied to the sense decision network 35. As noted with regard to the detector 31, the amplitude level selected upon which the various threshold detectors operate is previously selected in accordance with the known variations in input signal level and the number of stages of threshold detectors and amplifiers used. Likewise the extent of the amplification of each of the amplifiers 37 and 43 is previously selected to coincide with the number of stages used, the amplitude level that each threshold detector senses and the known variations in input signal level.

It is apparent that in the embodiment herein disclosed several various combinations can be generated by the range detector 21 and applied to the sense decision network 35. If the level of the input signal 15 to the range detector 21 is of insufficient magnitude, even after amplification by amplifiers 37 and 43, to operate any of the threshold detectors, 31, 39, 45, no signal is applied to the sense decision network 35. A second situation that could occur is where the level of the input signal is of relatively small value, however, after passing through the two amplifiers 37, 43 it is of sufficient magnitude to operate the third threshold detector 45, but not the first and second threshold detectors 31, 39. The third situation that can occur is that the level of input signal 15 is of medium magnitude insufficient to operate the first threshold detector 31. However, after it passes through the first amplifier 21 it is of sufficient magnitude to operate the second threshold detector 39 and therefore of sufficient magnitude to also operate the third threshold detector 45. The fourth situation that can occur is where the level of the input signal 15 is of sufficient magnitude to operate all three threshold detectors 31, 39, 45.

The simplest mode of operation is to have both amplifiers 37, 43 of a similar nature as well as to have all three threshold detectors 31, 39, 45 set to operate at the same signal amplitude. However, in the general embodiment the amplifiers can be designed to amplify by varying amounts and the threshold detectors can be selected to operate at different values of signal level. The only prerequisite is that the sense decision network 35, as hereinafter described, be able to interpret the outputs from the threshold detectors. The number of stages of the range detector described is only exemplary and a greater number of stages can be used depending upon the situation encountered.

Figure 3:
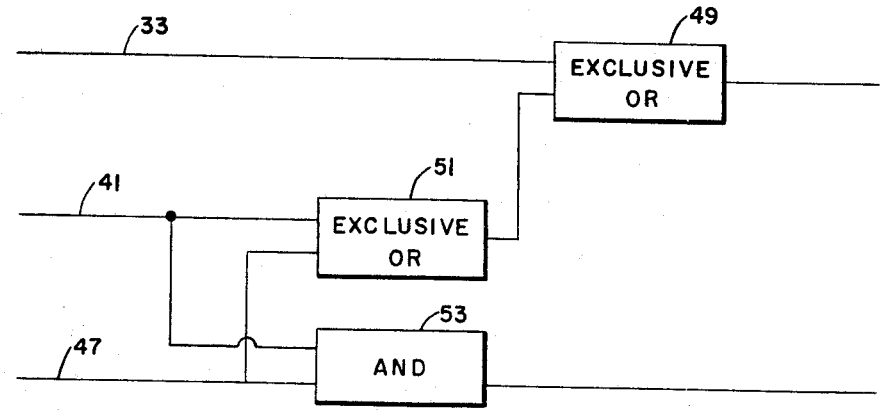
FIGURE 3 is a block diagram of one embodiment of the sense decision network utilized in FIGURE 1.

The sense decision network 35 determines the range of magnitude of the input signal and generates an output which reflects this range. FIGURE 3 is a block diagram of one embodiment of the sense decision network, for use with the number of stages of the range detector as described in FIGURE 2.

The output 33 from the first threshold detector 31 is applied to one input of a first EXCLUSIVE OR circuit 49. The output 41 from the second threshold detector 39 is applied to one input of a second EXCLUSIVE OR circuit 51, and, in addition, to one input of an AND circuit 53 as second inputs thereto. The output from the second EXCLUSIVE OR circuit 51 provides the second input to the first EXCLUSIVE OR circuit 49. The outputs from the first EXCLUSIVE OR circuit 49 and from the AND circuit 53 form the two outputs from the sense decision network 35. These two outputs, as shown in FIGURE 2, are applied to bistable multivibrator circuits 55 and 57 respectively. Provision is made for the resetting of the bistable multivibrators 55, 57 by the application of a reset pulse thereto from an external clock pulse source 59. The outputs 56, 58 from the multivibrators 55, 57 are applied to the attenuator controller 27 as hereinafter described. As explained hereinafter with reference to FIGURE 6, the outputs 56 and 58 (known as output bits A and B) are transmitted along with the compressed digital signal so that the resulting output signal will be expanded by the reciprocal of the compression factor.

Figure 4:
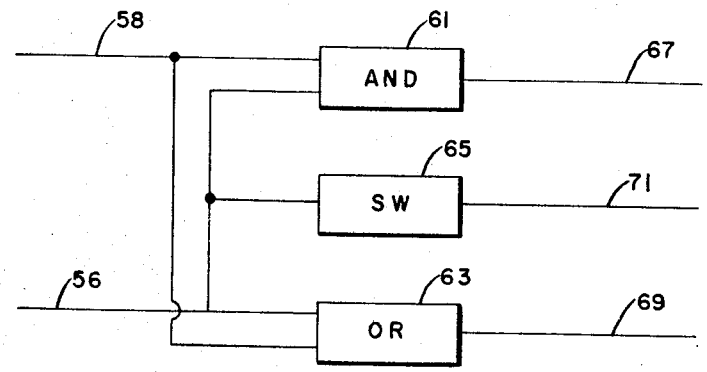
FIGURE 4 is a block diagram of one embodiment of the attenuator controller of FIGURE 1.

FIGURE 4 shows, in block diagram form, an exemplary diagram of the attenuator controller 27. The input to the attenuator controller are the outputs 56, 58 from the foregoing described multivibrators 55, 57. The output 58 from multivibrator 57 is applied to one input of an AND circuit 61 as well as to one input of an OR circuit 63. The output 56 from the second multivibrator 55 is applied to the second input of both the OR circuit 63 and the AND circuit 61 as well as the input to a simple switching circuit 65, which may be for example a transistor switch. The outputs 69, 67 and 71 of the OR circuit 63, the AND circuit 61 and the switch 65, respectively, are applied to the attenuator 19 to control the attenuator as hereinafter described.

FIGURE 5 shows in block diagram form, the attenuator network 19 utilized in the instant invention. The delayed signal from the time delay circuit 18 is first applied to a first attenuator circuit 73 of the attenuator network 19. This first attenuator is controlled by one of the outputs 69 from the attenuator control 27. The output signal from the first attenuator 73 is applied to a first amplifier 75 which amplifies the signal by a predetermined amount and, thereafter, is applied to a second attenuator circuit 77. This second attenuator 77 is controlled by a second output 71 from the attenuator control 27. The output signal from the second attenuator 77 is applied to a second amplifier 79 which again amplifies the signal to a predetermined amount. The output from the second amplifier 79 is applied to a third attenuator circuit 81 which is controlled by another output 67 from the attenuator control 27. The output from the third attenuator 81 is applied to a third amplifier 83. As hereinafter described, the output from the third amplifier 83 is now in condition for application to the analog-to-digital converter 23 shown in FIGURE 6

While no specific showing has been made as to the voltage controlled attenuator used in FIGURE 5, it should be understood that any device which changes its attenuation value by a predetermined amount upon the application of a signal thereto may be used Such a device could merely be a series arrangement of three resistors The input signal would be applied across the three resistors and an output would be obtained across two of the three resistors by a standard voltage divided technique. To provide the voltage control necessary to this attenuator it would be necessary to include a voltage controlled transistor switch across one of the aforementioned two resistors which would effectively short cut out the selected resistor upon the application of a signal thereto. Thus the total value of attenuation of the disclosed voltage controlled attenuator would be changed.

Figure 6:
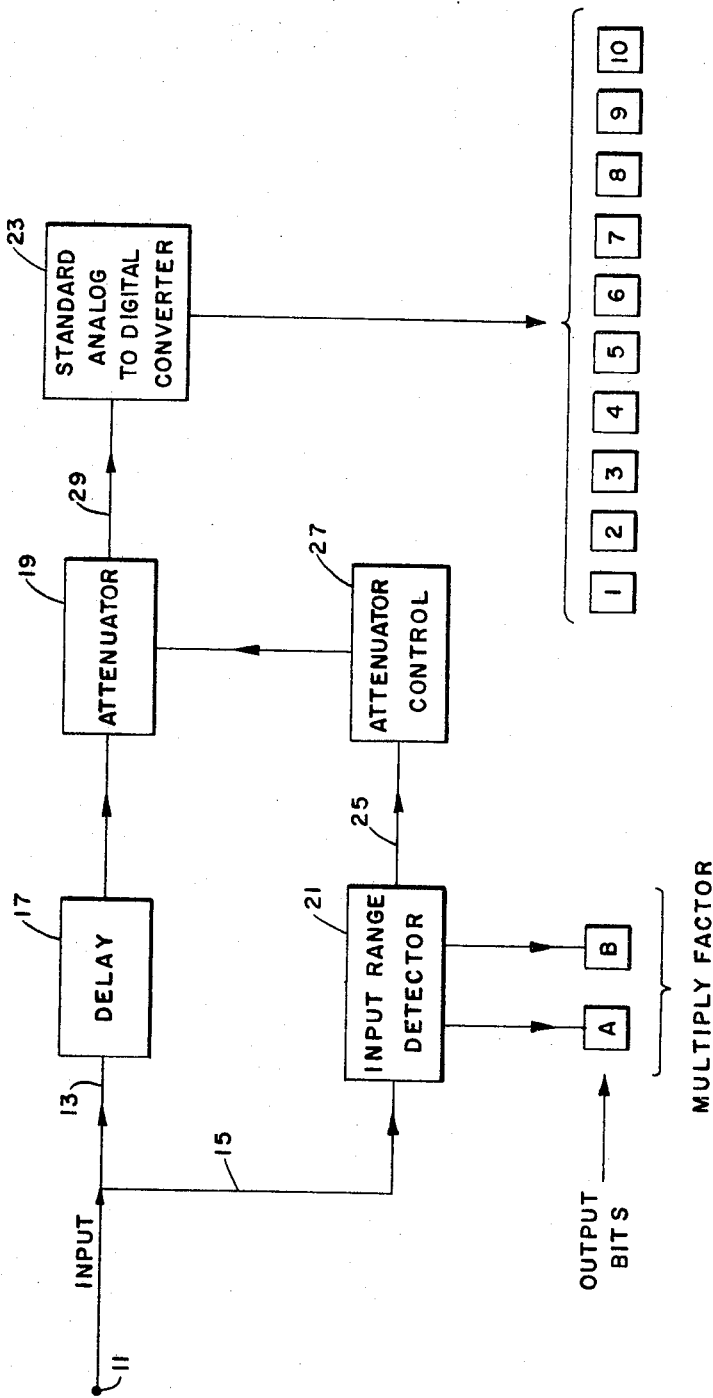
FIGURE 6 is a block diagram of the present invention showing the data compression circuit in conjunction with an A-to-D converter.

FIGURE 6 is a block diagram of the instant data compression system of FIGURE 1 used in conjunction with an analog-to-digital converter in order to extend the dynamic range of the converter through the use of bit compression. The A-to-D converter 23 is any standard type having a maximum range of 10 binary bits (0–1028). The use of the disclosed compression system increases the maximum dynamic range of the A-to-D converter to 16 bits (0–65.728), and compresses the 16 bits to 12 bits at the output.

In order to have the A-to-D converter digital output bits indicate the magnitude of the analog input signal, it is necessary to transmit the input signal range information, and this is done by transmitting bits A and B, which are the outputs of multivibrators 55 and 57. Reference is made to the table, to be described later, wherein it shows how the multivibrator output bits A and B indicate the four possible ranges of the input analog signal.

The operation of the instant invention is as follows: First it is assumed that the range of analog signals applied to this device is essentially known and the range of output signal level desired is also known. An analog input signal is applied to the system at its input terminal 11; this signal being applied both to the delay network 17 and the input range detector 21. Delay network 17 delays the signal for a predetermined period of time during which time the range detection and attenuation selection is performed. The range detector analyzes the signal to determine its magnitude range by applying the signal to the first threshold detector 31 and to the first amplifier 37. If the signal applied to the first threshold detector 31 is of sufficient magnitude, it causes this detector to generate an output signal which is applied to the sense decision network 35. The signal applied to the first amplifier circuit 37, is, after being amplified, applied to the second threshold detector 39 and the second amplifier circuit 43. If this amplifier signal is of sufficient magnitude it causes the second threshold detector 39 to generate an output signal which is also applied to the sense decision network 35. The output signal from the second amplifier circuit 43 is applied to the third threshold detector 45 and, if it is of sufficient magnitude, causes said third threshold detector circuit 45 to operate and generate an output which is also applied to the sense decision network 35.

An illustrative range of attenuation for the disclosed data compression system is discussed below with regard to the attenuator network 19. In this example, the range of the attenuator network 19 is selected so as to handle input signal whose range is equal to 1, 4, 16, or 64 times the dynamic range of the device used (such as A-to-D converter 23) with the disclosed compression system. The signal arriving at the input of such a device is attenuated by 1, 4, 16, or 64 respectively as required. Thus the signal arriving at this device is always within its range of operation. To acomplish these conditions, the threshold detectors 31, 39 and 45 are set to actuate for ranges 1, ×4, ×16 and ×64 and the amplifiers 37 and 43 are set to have a gain of 4.

The sense decision network 35, as shown in its exemplary embodiment in FIGURE 3 operates as follows: If the amplitude of the input signal is very small and none of the three threshold detectors 31, 39, 45 have operated even after the signal is amplified by amplifiers 37 and 43, no voltage is applied to any of the three inputs to the sense decision network. The output from the sense decision network 35 represents this condition, and no output signal is generated, therefore. If a signal of nominal magnitude has been applied to the overall system but is of insufficient magnitude to operate the first threshold detector 31 and even after passing through the first amplifier 37 is of insufficient magnitude to operate the second threshold detector 39, but after passing through the second amplifier 43, the signal is of sufficient magnitude to operate the third threshold detector 45, one input to the sense decision network 35 has a signal thereon. Specifically, the output 47 from the third threshold detector 45 applies a signal both to the AND circuit 53 and the first EXCLUSIVE OR circuit 51. Since no signal is present at the other input, EXCLUSIVE OR circuit 51 applies an input signal to one input of the second EXCLUSIVE OR circuit 49 which operates and generates an output signal, since the requirement of having no signal present at its second input is met. Consequently, for this condition, one output from the sense decision network 35 has an output signal while the second output has no signal.

In a similar manner, if the third threshold detector 45 and the second threshold detector 39 both apply a signal to the sense decision network 35, due to a signal of medium magnitude being applied at the input terminal 11, the AND circuit 53 operates and generates an output signal, however, the first EXCLUSIVE OR circuit 51 does not operate due to a voltage being applied to both of its inputs. Consequently, the second EXCLUSIVE OR circuit 49 does not operate and the output from the sense decision network 35 is the reverse of the foregoing situation i.e., the output signal of the sense decision network is now at the output which carried no signal in the foregoing situation and no signal is present at the other output. In the fourth situation a large signal is applied to the input terminal 11 which causes all three threshold detectors 31, 39, 49 to operate and generate output signals. Now the AND circuit 53 generates an output signal as does second EXCLUSIVE OR circuit 49, since this latter circuit has only one signal applied to it, due to the fact that no signal is generated by first EXCLUSIVE OR circuit 51.

In the specific example being discussed, the first example of the operation of the range detector is range 1; the second example is range ×4; the third example is range ×16; and the final example is range ×64.

Turning now to a discussion of the operation of the attenuation controller 27. Since the input to the attenuation controller 27 is connected to the output from the sense decision nework 35 through two bistable multivibrators 55, 57, all of the foregoing described situations can be directly applied as inputs to the attenuator controller, and will be discussed in the aforedescribed order. In the first instance described above, there is no output signal from the range detector 21. Consequently, there is no input signal to the attenuator controller on either of its two inputs 56, 58 and neither the AND circuit 61, the switch 65 nor the OR circuit generate an output.

In the second situation, one input, 56, to the attenuation controller 27 carries no signal while the second input 58, carries a signal. In this situation, a signal is applied to one input of both the OR circuit 63 as well as to the AND circuit 61. The OR circuit 63 will generate a signal on output 69 which is then applied to the attenuator 19 as hereinafter described. However, the AND circuit 61 will not generate an output signal in this instance since there is only one signal present at its input.

The third situation is where a voltage is applied to the second input 56 and none to the first input 58, the reverse of the foregoing. Under this third situation, the OR circuit 63 again operates and generates an output signal since it has a signal applied to one of its inputs. In addition, the switch 65 operates, since it has a signal applied to its input, however, the AND circuit 61 does not operate since it has an input signal applied to only one of its inputs. Consequently, output signals are generated on outputs 69, 71.

The fourth situation is when a voltage is applied to both of the inputs to the attenuator control 27. In this situation all of the circuits, the AND circuit 61, the switch 65, and the OR circuit 63 generate output signals. Thus a signal is applied to each of the attenuator circuits 73, 77 and 81 as hereinafter described. The attenuator network 19 is designed to operate in a manner which provides a minimum transient effect on the signal being passed therethrough. In the prefered embodiment, the individual circuits 73, 77, 81 are voltage controlled attenuators which have two states. The first or normal state provides a minimum of attenuation while the second state provides a higher amount of attenuation. For example, the first state may attenuate the input signal by one-fifth of its level, i.e., pass four-fifths of the signal, whereas the second state may attenuate the signal by four-fifths of its level, i.e., pass one-fifth thereof. What state is utilized is, of course, determined by the amount of attenuation to be applied to the signal, which in turn is determined by the desired magnitude range of the output signal. Since the desired output range is known and the magnitude of the input range has been determined by the range detertor 21, the attenuator controller 27 has been "informed" of what this input range is so that it can make a determination of the amount of attenuation necessary to attenuate the input signal so that it falls in the desired ouput range.

Even though each attenuator of the preferred embodiment has only two states of attenuation, the overall attenuation is greatly enhanced by a system having three attenuators in series. When all of the attenuators apply the lower value of attenuation and the amplifiers 75, 79 and 83 are designed to provide a gain of 5, the overall system provides a gain of ($4/5 \times 5 \times 4/5 \times 5 \times 4/5 \times 5$) or 64. If only the first attenuator 73 is switched to its higher attenuation state, the signal passed through the network 19 in this instance has a relative gain of ($1/5 \times 5 \times 4/5 \times 5 \times 4/5 \times 5$) or 16. If the first and second attenuators are switched to their higher attenuation states, the relative gain is ($1/5 \times 5 \times 1/5 \times 5 \times 4/5 \times 5$) or 4, while if all three attenuators are switched to their high attenuation states, the relative gain to the signal pass is ($1/5 \times 5 \times 1/5 \times 5 \times 1/5 \times 5$) or unity.

It should be understood that in the embodiment disclosed each stage of network 19 has a voltage controlled network and an amplifier. This is for the reason that in the design problem first encountered the level of the input singal ranged from a very low amplitude to an amplitude of a desired range. Therefore it was necessary to amplify the low amplitude signal by ×64 while the high amplitude signal was in effect multiplied by ×1. However, the reverse situation may occur wherein it is desired not to use any amplifiers in network 19 and only attenuators need be used. It is also possible to utilize a combination of the above wherein the middle range of amplitude levels is the desired level. In that event, a combination of stages should be used, some with amplifiers and attenuators and some with only attenuators.

Since transients are created by switching, the desired system must keep the switching to a minimum, as well as provide a method of switching which creates minimum transients. This will then result in a system having the smallest error caused by transient effects. The instant invention obtains this desired result in that it provides an output having a constant maximum percentage of error throughout the output range. Specifically, for a small input signal where no attenuation is required no switching is performed and thereby no switching transients are generated. This is range ×1. When a signal requires only a small amount of attenuation only the first attenuator 73, is switched from its normal or low state to its higher attenuation state. Transients generated by this switching action are small compared with the magnitude of the signal since only one switch has been activated, thereby creating only minimal transient effects compared with the magnitude of the signal. The signal is then amplified and passed through the other attenuators and amplifiers which are not switched and thereby do not create additional transients. This is range ×4.

If a higher magnitude signal is to be compressed, the first and second attenuators 73, 77 are switched to their higher attenuation states. Even though switching both attenuators to their highest attenuation states creates greater transients than would be generated if just the first attenuator were switched, this switching has a minor proportional effect on the signal since it is of greater magnitude. Specifically, the switching creates transients of insufficient magnitude to lose the information contained in the compressed signal. This is range ×16.

Further, if a signal of high magnitude is to be compressed all three attenuators 73, 77, 81 are switched to their higher attenuation states but again the transients created (by these three attenuators) are insufficient to lose the information contained in the high magnitude signal. This is range ×64.

To aid in understanding the instant invention the following table is provided for comparison of the conditions existing for any particular condition where 0 equals a no signal output and 1 equals a signal output:

TABLE

| Situations | Output from threshold detectors | | | Output from range detectors | | Output from attenuator controller | | | Range |
| --- | --- | --- | --- | --- | --- | --- | --- | --- | --- |
| | First (31) | Second (39) | Third (45) | First (53) Multivibrator A | Second (57) Multivibrator B | OR (63) | SW (65) | AND (63) | |
| No. 1 | 0 | 0 | 0 | 0 | 0 | 0 | 0 | 0 | ×1 |
| No. 2 | 0 | 0 | 1 | 1 | 0 | 1 | 0 | 0 | ×4 |
| No. 3 | 0 | 1 | 1 | 0 | 1 | 1 | 1 | 0 | ×16 |
| No. 4 | 1 | 1 | 1 | 1 | 1 | 1 | 1 | 1 | ×64 |

It is seen from the above table that bits A and B of multivibrators 55 and 57 yield the input signal range information. Therefore, as shown in FIGURE 6, it is necessary to transmit this range information along with the output from the analog-to-digital converter so that both the amount of compression applied to the input signal as well as the information contained in the signal is transmitted, resulting in a complete rather than partial transmission of the information contained in the input analog signal.

Obviously many modifications and variations of the present invention are possible in light of the above teachings. For example, the foregoing teachings have been directed to compression of the signal for the subsequent analog-to-digital conversion thereof. However, this compression could also be performed to place any analog signal within a range which is more easily measurable due to limitations of the measuring instrumentation utilized.

In addition the foregoing description of the preferred embodiment of the invention is not to be construed as limited to four situations described above.

All that is required to obtain wider range compression are additional sets of amplifiers and threshold detectors in the range detector, a sense decision network with increased capacity, an increase in the capacity and logic of the attenuator control circuit as well as additional attenuator-amplifier stages in the amplifier.

It is therefore to be understood that within the scope of the appended claims, the invention may be practiced otherwise than as specifically described.

What is claimed is:

1. Apparatus for data compression of an electromagnetic analog signal comprising:
    (a) delay means for delaying said electromagnetic signal for a predetermined period of time;
    (b) input range detector means for detecting the magnitude of said electromagnetic signal and generating an output signal indicative of the magnitude of said electromagnetic signal;
    (c) attenuator control means having an input coupled to the output of said input range detector means for controlling the magnitude of attenuation of said electromagnetic signal in response to the output signal generated by said input range detector means; and
    (d) variable attenuator means connected to said delay means and said attenuator control means and responsive to said attenuator control means for attenuating said electromagnetic signal in varying amounts determined by said attenuator control means, said variable attenuator means comprising:
        (1) a first attenuator circuit to which the output from said delay means is applied,
        (2) a first amplifier whose input is connected to the output of said first attenuator circuit,
        (3) a second attenuator circuit whose input is connected to the output of said first amplifier,
        (4) a second amplifier whose input is connected to the output of said second attenuator,
        (5) a third attenuator circuit whose input is connected to the output of said second amplifier, and
        (6) a third amplifier whose input is connected to the output of said third attenuator circuit, each of said attenuator circuits being connected to said attenuator control means and having the individual attenuation of each circuit controlled thereby.

2. Apparatus set forth in claim 1 wherein said detector means comprises: a sense decision network; a first threshold detector having the input electromagnetic signal applied thereto and the output connected to said sense decision network; a first amplifier having the electromagnetic signal applied to its input; a second amplifier; the output from said first amplifier being applied to the input of said second amplifier; a second threshold detector being connected between said first and second amplifier and having an output connected to said sense decision network; a third threshold detector; the output from said second amplifier being applied to said third threshold detector; the output from said third threshold detector being connected to said sense decision network and a bistable multivibrator circuit connected to each of the two outputs of said sense decision network.

3. Apparatus set forth in claim 2 wherein said sense decision network comprises: a two input AND logic circuit having one input connected to the output of said third threshold detector and the second input connected to the output of said second threshold detector; a two input first EXCLUSIVE OR logic circuit having one input connected to the output of said third threshold detector and the second input connected to the output of said second threshold detector; and a two input second EXCLUSIVE OR logic circuit having one input connected to the output of said first threshold detector and the second input connected to the output of said first EXCLUSIVE OR logic circuit.

4. Apparatus set forth in claim 2 wherein said attenuator control means comprises: a two input AND logic circuit having one input connected to the output of one of said bistable multivibrator circuits and said second input connected to the output of said second bistable multivibrator circuit; a two input OR logic circuit having one input connected to the output of one of said bistable multivibrator circuits and said second input connected to the output of said second bistable multivibrator circuit; and a switching circuit having one input connected to the output of one of said bistable multivibrator circuits; the output from said AND logic circuit connected to control said first attenuator circuit, the output from said switching circuit connected to control said second attenuator circuit and the output from said OR logic circuit connected to control said third attenuator circuit.

5. Apparatus for data compression of a wide dynamic range analog signal comprising:
    (a) time delay means for delaying said analog signal for a predetermined period of time;
    (b) attenuator means for attenuating the signal supplied thereto comprising, a first attenuator circuit to which the output from said delay means is applied, a first amplifier whose input is connected to the output of said first attenuator circuit, a second attenuator circuit whose input is connected to the output of said first amplifier, a second amplifier whose input is connected to the output of said second attenuator circuit, a third attenuator circuit whose input is connected to the output of said second amplifier, and a third amplifier whose input is connected to the output of said third attenuator circuit;
    (c) amplitude detection means for detecting the magnitude of said analog signal applied thereto comprising, a sense decision network, a first, second and third threshold detector each having different threshold levels, a first and second amplifier, said first threshold detector having said input analog signal applied thereto and the output connected to said sense decision network, said first amplifier having said input analog signal applied to its input and the output connected to said second threshold detector and said second amplifier, the output from said second threshold detector connected to said sense decision network, the output of said second amplifier connected to said third threshold detector, the output of said third threshold detector connected to said sense decision network, and a bistable multivibrator circuit connected to each of two outputs of said sense decision network; said amplitude detection means having its input connected to the input of said time delay means and having an output which is a digital representation of the magnitude of said analog signal applied thereto;

(d) attenuator control means having its input connected to the output of said amplitude detection means, said attenuator control means having its output connected to each of said attenuator circuits for controlling the level of attenuation of said attenuator means; and (e) output means connected to the output of said attenuator means and receiving the attenuated analog signal therefrom, the level of attenuation being determined by the magnitude of the analog signal applied to said amplitude detection means.

6. Apparatus set forth in claim 5 wherein said sense decision network comprises: a two input AND logic circuit having one input connected to the output of said third threshold detector and the second input connected to the output of said second threshold detector; a two input first EXCLUSIVE OR logic having one input connected to the output of said third threshold detector and the second input connected to the output of said second threshold detector; and a two input second EXCLUSIVE OR logic circuit having one input connected to the output of said first threshold detector and the second input connected to the output of said first EXCLUSIVE OR logic circuit.

7. Apparatus set forth in claim 5 wherein said attenuator control means comprises: a two input AND logic circuit having one input connected to the output of one of said bistable multivibrator circuits and said second input connected to the output of said second bistable multivibrator circuit; a two input OR logic circuit having one input connected to the output of one of said bistable multivibrator circuits and said second input connected to the output of said second bistable multivibrator circuit; and a switching circuit having one input connected to the output of one of said bistable multivibrator circuits; the output from said AND logic circuit connected to control said first attenuator circuit, the output from said switching circuit connected to control said second attenuator circuit and the output from said OR logic circuit connected to control said third attenuator circuit.

References Cited

UNITED STATES PATENTS 3,130,400  4/1964  Washburn _____ 340—347
3,180,939  4/1965  Hall _____ 179—15

MAYNARD R. WILBUR, Primary Examiner

C. D. MILLER, Assistant Examiner